Nov. 21, 1967  A. C. COFFMAN  3,353,757
MILL-JAR SUPPORT
Filed July 23, 1965
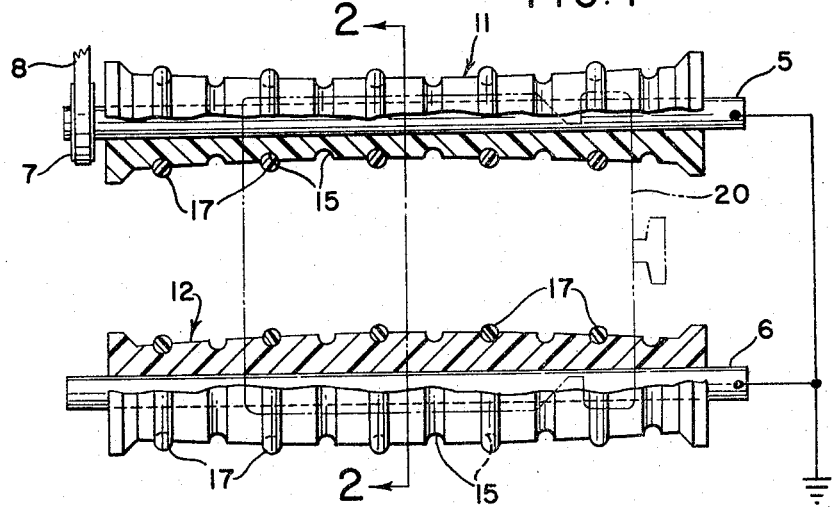
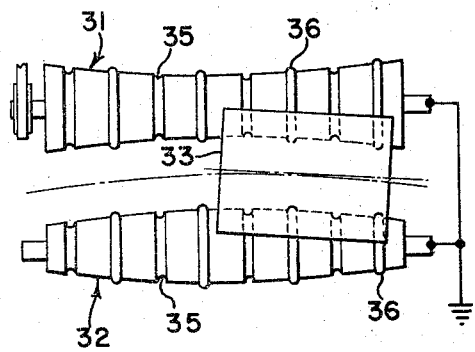
INVENTOR.
ALFRED C. COFFMAN
BY
ATTORNEY

3,353,757
MILL-JAR SUPPORT
Alfred C. Coffman, Akron, Ohio, assignor, by mesne assignments, to U.S. Stoneware, Inc., a corporation of Massachusetts
Filed July 23, 1965, Ser. No. 474,393
5 Claims. (Cl. 241—176)

This invention relates to rolls for the support of a jar during grinding on a mill, one or both of the rolls being adapted to be driven.

Rubber-covered rolls with cores of steel or the like, have been used for this purpose, the cores being electrically conductive. In use, static electricity is developed, and it is desirable to have the rolls covered in electrically conductive rubber, that is rubber or the like which is loaded with acetylene black or the like so that any static that is developed is conducted to the metal cores of the rolls which are grounded. An objection to this is the low abrasion resistance of such rubber.

According to this invention, the rolls are covered with rubber or other elastomer which contains sufficient acetylene black or the like to make it conductive so that no appreciable static electrical charge is developed, and the rolls are covered with spaced rings of polyurethane or other wear-resistant elastomer composition, which are raised slightly from the roll surfaces. This gives long life to the rolls.

It is advantageous to partially embed the polyurethane rings in grooves, and it is further advantageous to provide empty grooves in the roll surfaces. When the mill is in operation, the weight of the jar flattens the rings as it comes into rolling contact with them so that the jar contacts the electrically conductive surface. This prevents a static charge from building up. The weight of the jar flexes the walls of the grooves as it rolls over them, and this flexing tends to clean the rolls.

The invention is further disclosed in connection with the accompanying drawings, in which:

FIGURE 1 is a plan view of a concave roll and a convex roll supporting a jar, the jar being shown in phantom;

FIGURE 2 is a vertical section on the line 2—2 of FIGURE 1;

FIGURES 3 and 4 are enlarged details showing the use of polyurethane rings of different cross-sectional shapes; and FIGURE 5 is a schematic plan view of a mill on rolls of greater convexity and concavity.

FIGURES 1 and 2 illustrate a mill-jar drive of two rolls, each of which has a steel shaft 5, 6 as a core. The shaft 5 is provided with a pulley or other driving element (e.g. a sprocket) 7, and the belt 8 drives the shaft. The shaft 5 is provided with concave cover 11, and the shaft 6 with convex cover 12. Both covers are formed of electrically conductive neoprene rubber (polychloroprene) or other elastomer made electrically conductive by loading with an electrically conductive type carbon black or the like.

Grooves 15 are spaced longitudinally along the surface of each roll, and polyurethane rings 17 are located in some of the grooves. This is advantageously done by stretching the respective rings and snapping them into place. These rings are much more abrasion resistant than the elastomeric covers.

The polyurethane rings may be circular in cross section, as in FIGURES 1 and 3, or any other shape, and the grooves may be large in cross section so that the rings 17 can flatten out within them, as shown in FIGURE 3, or they may be square and lathe cut, as the ring 18 in FIGURE 4. Although there may be a ring in each groove, alternatively there may be empty grooves.

The jar 20 may be of any usual cylindrical shape. It rests on the rolls. As one or both rolls are driven, the jar revolves with them. In general, it rides on the polyurethane rings, making light pressure contact with the roll covers 11 and 12. Static electricity developed is conducted by the covers to the shafts 5 and 6 which are grounded by suitable means. The rings protect the covers from being subjected to excessive wear.

The rings 17 and 18 provide rolling support for the jar. While the jar is supported on the rings, they flatten and squeeze the sections of the roll surfaces between them. This tends to collapse the intermediate grooves. Although the collapsing movement is only slight, there is more movement than if the rolls were not grooved, and this contraction and expansion of the surface causes dirt accumulated on these surfaces to flake off.

FIGURE 5 is quite schematic, and illustrates the application of the invention to rolls 31, 32 which are of greater concavity and convexity, respectively, than the covers of FIGURES 1 and 2. The jar 33 is relatively smaller and the grooves 35 and rings 36 may be closer together. There may be two or more empty grooves between each two rings.

The invention is covered in the claims which follow.

What I claim is:

1. A mill-jar support and drive which comprise two horizontally spaced elastomer-covered metal rolls, the elastomer in at least one of which covers is electrically conductive, and longitudinally spaced wear-resistant elastomeric rings which stand out from the roll surfaces to support the jar, the rings being more abrasion resistant than the elastomeric cover but flattening under the weight of a jar so that the jar contacts the electrically conductive cover.

2. The support of claim 1 in which the surface of one roll is convex and the surface of the other roll is concave.

3. The support of claim 1 in which both covers are composed of neoprene loaded with electrically conductive carbon black.

4. The support of claim 1 in which the rings are essentially polyurethane.

5. The support of claim 1 in which the surfaces of the rolls are grooved at intervals longitudinally thereof and there are elastomeric rings in some, but only some of the grooves.

References Cited

UNITED STATES PATENTS 2,225,417  12/1940  Kleinfeldt _____ 241—176
3,012,334  12/1961  Davis _____ 15—21 X WILLIAM W. DYER, Jr., *Primary Examiner.*

W. D. BRAY, *Assistant Examiner.*